United States Patent [19]
Guizot et al.

[11] Patent Number: 5,889,213
[45] Date of Patent: Mar. 30, 1999

[54] APPARATUS FOR MEASURING A FLUID FLOW RATE, THE APPARATUS INCLUDING AT LEAST ONE ELEMENT FOR MODIFYING THE SPEED PROFILE OF SAID FLUID FLOW

[75] Inventors: Jean-Luc Guizot, Charenton le Pont; Andrew John Parry, Bourg la Reine, both of France

[73] Assignee: Schlumberger Industries, S.A., Montrouge, France

[21] Appl. No.: 862,089

[22] Filed: May 22, 1997

[30] Foreign Application Priority Data

Apr. 30, 1996 [FR] France .................................. 96 05445

[51] Int. Cl.⁶ ......................................................... G01F 1/20
[52] U.S. Cl. .......................................................... 73/861.19
[58] Field of Search ............................ 73/861.19, 861.21, 73/861.22, 861.18

[56] References Cited

U.S. PATENT DOCUMENTS 5,157,974  10/1992  Hattori et al. ...................... 73/861.19
5,396,808   3/1995  Huang et al. ....................... 73/861.19

FOREIGN PATENT DOCUMENTS 2663417  6/1991  France .
2690717  4/1992  France .
2730278  2/1995  France .
2746147  3/1996  France .
0124711  5/1989  Japan .................................. 73/861.19

Primary Examiner—Harshad Patel
Attorney, Agent, or Firm—Leonard W. Pojunas

[57] ABSTRACT

An apparatus measures the flow rate of a fluid. The apparatus comprises a fluidic oscillator provided with an elongate slot in a direction Oz and suitable for forming a jet of fluid that oscillates in a plane Oxy perpendicular to the Oz direction, and an obstacle located upstream from the slot to modify the distribution of speeds in the flow. The obstacle is in the flow at least in the central portion thereof and is implemented in the form of a substantially plane plate.

15 Claims, 14 Drawing Sheets

APPARATUS FOR MEASURING A FLUID FLOW RATE, THE APPARATUS INCLUDING AT LEAST ONE ELEMENT FOR MODIFYING THE SPEED PROFILE OF SAID FLUID FLOW

The present invention relates to apparatus for measuring the flow rate of a fluid, the apparatus comprising a fluidic oscillator provided with an elongate slot in a direction Oz suitable for forming a jet of fluid that oscillates in an Oxy plane perpendicular to said direction, together with means for modifying the distribution of speeds within the flow.

BACKGROUND OF THE INVENTION

It has been known for many years that a fluidic oscillator can be used to measure the flow rate of a flowing fluid.

Document FR 2 663 417 discloses apparatus for measuring the flow rate of a fluid by making use of a fluidic oscillator. The apparatus described therein comprises, from an upstream end to a downstream end: a metal screen for modifying the speed distribution of the fluid flow; and a slot that is elongate in an Oz direction and suitable for forming a fluid jet that oscillates in an Oxy plane perpendicular to said direction and within an oscillation chamber.

The oscillation chamber has a plurality of obstacles including one situated facing the slot and two lateral obstacles serving to define recirculation flows centered on said obstacles and enabling the fluid jet to be switched from one lateral obstacle to the other. The fluid jet thus adopts "oscillating" motion which takes place at a frequency that is representative of the flow rate of the fluid.

The oscillation frequency of the jet is detected, for example, by means of pressure pickups situated at the extreme points of the sweep of the jet of fluid, and connected to known electronic systems.

The oscillation frequency of the jet is associated with the flow rate of the fluid by prior calibration.

The measurement apparatus presents curves of error as a function of flow rate that are acceptable, given the intended applications.

Nevertheless, the Assignee has observed that in the presence of fluids, such as gases, conveying impurities (particles, dust, . . . ), the impurities can accumulate in the openings of the metal screen, thereby disturbing the distribution of speeds in the flow between said screen and the slot of the fluidic oscillator.

That phenomenon therefore runs the risk of degrading the performance of the measurement apparatus quite quickly, and after the apparatus has been in operation for a few years the openings can become completely obstructed, thus making any flow rate measurement impracticable.

The above contamination phenomena are made worse when the fluid concerned is hot water.

OBJECT AND BRIEF SUMMARY OF THE INVENTION

It would therefore be advantageous to obtain apparatus for measuring a fluid flow rate by using a fluidic oscillator and avoiding problems of contamination that can arise when the fluid conveys significant quantities of impurities.

As a solution to this problem, the present invention proposes an apparatus for measuring the flow rate of a fluid, the apparatus comprising a fluidic oscillator provided with an elongate slot in a direction Oz and suitable for forming a jet of fluid that oscillates in a plane Oxy perpendicular to said direction, and means located upstream from the slot to modify the distribution of speeds in the flow, wherein said means comprise at least one element forming an obstacle to the flow at least in the central portion thereof and implemented in the form of a substantially plane plate.

The element(s) in the form of substantially plane plate(s) located in the flow in order to modify its speed profile does not present any roughness or openings in which the various particles conveyed by said flow could accumulate and end up by obstructing passage of the flow.

By placing one or more plane plates to form at least one obstacle to the flow in the central portion thereof, the speed of the flow in its center is reduced, and the energy contained in the resulting jet of fluid is increased, thereby contributing to improving the linearity of the fluidic oscillator.

It should also be emphasized that prior art document FR 2 663 417 dissuades the person skilled in the art from placing an obstacle in the flow upstream from the slot of a fluidic oscillator in order to avoid forming turbulent flow that would run the risk of disturbing the jet oscillation phenomenon.

According to a characteristic of the invention, the plate is substantially perpendicular to the Oxy plane.

According to another characteristic of the invention, the fluid flows along a direction Ox at said slot and the element forming an obstacle to the flow is symmetrical about the Oxz plane.

When the fluid flows in an Ox direction at said slot and the element forming an obstacle to the flow is substantially perpendicular to the oxy plane and is asymmetrical about the Oxz plane, the Assignee has observed that the speed of the flow in the center thereof in the Oz direction is further reduced compared with an element that is symmetrical about the Oxz plane.

In an embodiment of the invention, the apparatus includes side walls that are substantially perpendicular to the Oxy plane, that are symmetrical about the Oxz plane, and that guide the flow to the slot.

The element(s) forming an obstacle to the flow can be secured to at least one of the side walls of the apparatus or can be remote from the side walls of the apparatus.

In which case, the element forming an obstacle to the flow is secured to a support which is disposed in the fluid flow.

By way of example, the support may form a flow conditioner for said apparatus in which the conditioner splits the flow into two "fractional" flows that reunite in a zone situated substantially in the Oxz plane upstream from the slot.

The element(s) forming an obstacle to the flow is/are disposed in said zone and/or distributed on the path of each fractional flow.

According to a characteristic of the invention, the total extent of the element(s) forming an obstacle to the flow in the Oz direction is less than the local size in said direction of the apparatus, so as to leave an empty space for the flow on either side of said element(s) in said direction.

According to another characteristic of the invention, the extent of the element(s) forming an obstacle to the flow in a direction contained in the Oxy plane increases with decreasing angle formed by said element(s) with the local direction of the flow.

The means for modifying the speed distribution may comprise a plurality of elements forming an obstacle to the flow and distributed along the Oz direction.

More particularly, consecutive elements are offset angularly relative to one another.

According to a characteristic of the invention, the elements which are situated in the central portion of the flow in the Oz direction, referred to as "central" elements, extend in a direction contained in the Oxy plane further than do elements situated on either side of the central elements in the Oz direction.

By way of example, all of the elements may extend the same amount in a direction contained in the Oxy plane.

The means for modifying the speed distribution may also comprise only one element forming an obstacle to the flow and extending in a direction contained in the Oxy plane further in its central portion than on either side thereof in the Oz direction.

The element in the form of a plate may be substantially perpendicular to the Oxz plane. Under such circumstances, the plate may be at an angle relative to the Oxy plane which increases with decreasing area of said plate as encountered by the flow of fluid.

It is possible to use the apparatus of the invention for any type of fluid such as gases and liquids, and in particular for hot water. With hot water, the problem of contamination by impurities conveyed by the flow is even more crucial than it is with gases. The invention also applies to fuels for motor vehicles.

BRIEF DESCRIPTION OF THE DRAWINGS

Other characteristics and advantages appear from the following description given by way of illustrative but non-limiting example, and made with reference to the accompanying drawings, in which:

FIG. 2b is a perspective view of a first variant of the element shown in perspective in FIG. 2a;

FIG. 3b is an error curve showing error E as a function of Reynolds number obtained at the slot 14 with the measurement apparatus of FIG. 1 and in which the FIG. 2 element has been replaced by the elements of FIG. 3a;

FIG. 4b is an error curve showing error E as a function of Reynolds number obtained at the slot 14 with the measurement apparatus of FIG. 1, in which the FIG. 2a element has been replaced by the elements of FIG. 4a;

MORE DETAILED DESCRIPTION

Figure 1:
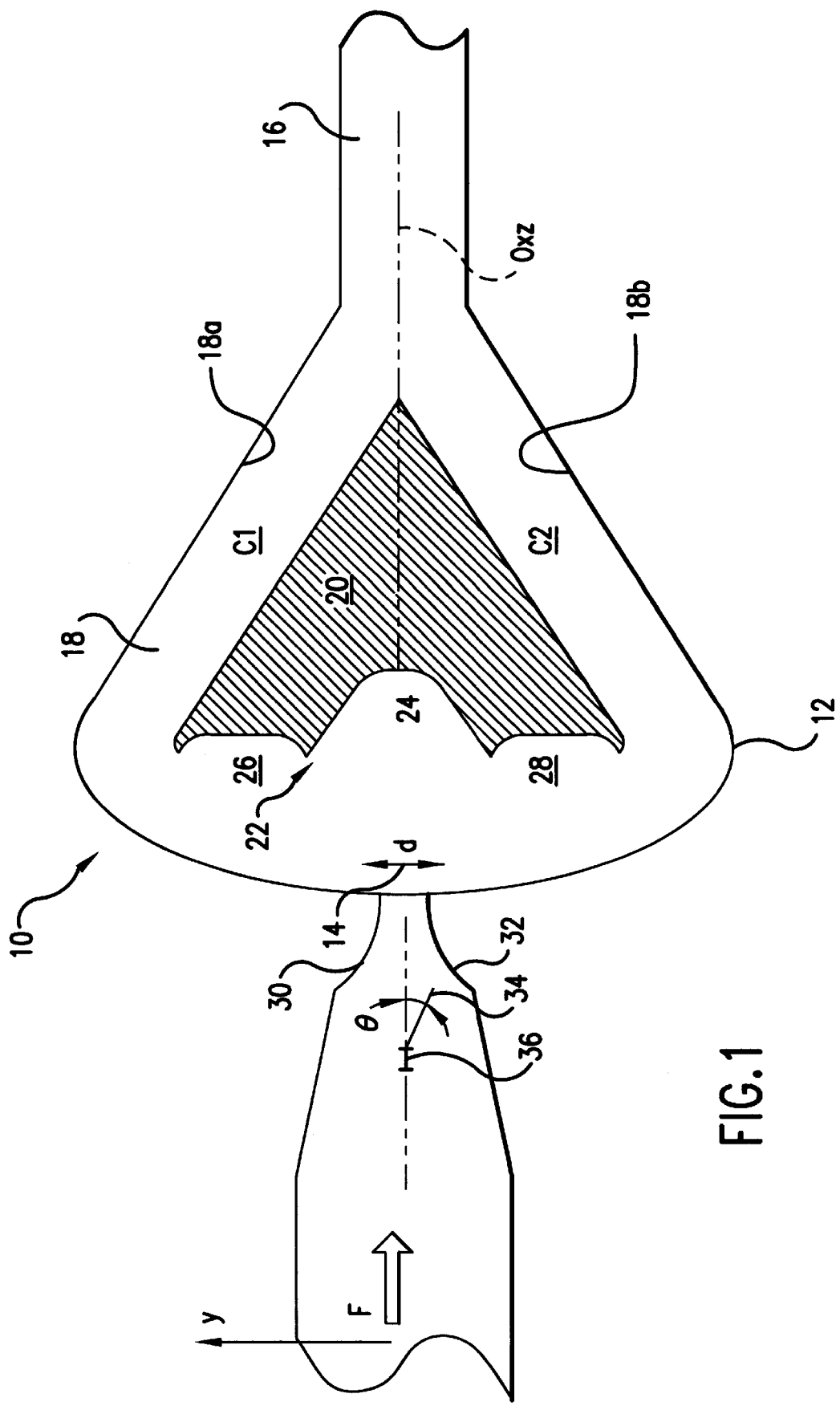
FIG. 1 is a plan view of measurement apparatus constituting a first embodiment of the invention.

As shown in FIG. 1 and given overall reference 10, apparatus for measuring the flow rate of a gas includes a fluidic oscillator 12 of the kind constituting the subject matter of French patent FR 2 690 717.

The measurement apparatus 10 is symmetrical about a longitudinal plane of symmetry Oxz having in alignment therealong both an inlet 14 and an outlet 16 for the flow of gas. The inlet 14 is implemented in the form of a slot whose transverse dimension or width is constant, d, and which is elongate in the direction Oz perpendicular to the plane of FIG. 1.

This slot transforms the gas flow passing through it and represented by arrow F into a two-dimensional fluid jet (the fluid jet remains more or less the same in the Oz direction), which jet oscillates in the Oxy plane transversely relative to the longitudinal plane of symmetry Oxz.

The fluidic oscillator 12 comprises an oscillation chamber 18 into which the gas jet opens out via the slot 14, and which has an obstacle 20 located in the middle thereof and occupying the major portion of said chamber. The side walls 18a and 18b of the oscillation chamber 18 co-operate with the walls of the obstacle 20 to define two channels C1 and C2 which allow the flow of gas to escape alternately via one or the other of the channels towards the outlet 16 of the fluidic oscillator. The obstacle 20 has a front wall 22 facing the slot 14 and a cavity 24 is formed therein situated directly opposite said slot, which cavity is swept by the gas jet during its oscillating motion.

The jet splits into two flows after striking the cavity.

On either side of the central cavity 24 the front wall 22 of the obstacle 20 has two secondary cavities 26 and 28 which have the function of causing the radial extent of the turbulence created during the jet oscillation phenomenon to depend on flow conditions, as described in French patent FR 2 690 717.

Upstream from the slot 14, the apparatus 10 has two side walls 30 and 32 which are symmetrical about the longitudinal plane of symmetry Oxz, perpendicular to the plane Oxy, and which serve to guide the flow of gas to the slot 14.

The measurement apparatus of the invention also includes means 34 placed upstream from the slot 14 and serving to modify the distribution of speeds within the flow. These means comprise a plate-shaped element that is substantially plane and that is placed in the gas flow, having the function of constituting an obstacle to said flow, mainly in the central portion thereof.

Figure 2A:
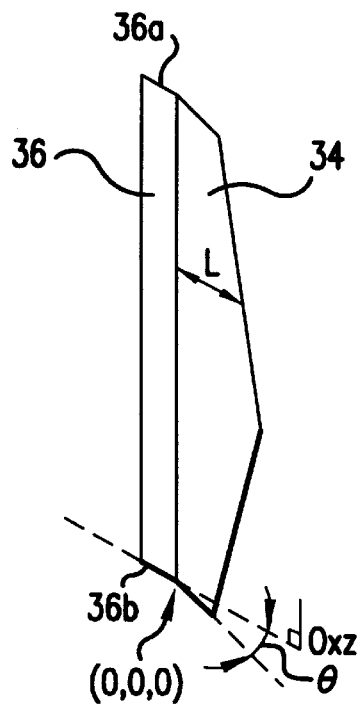
FIG. 2a is a perspective view of the element shown in FIG. 1 and forming an obstacle to the flow.

As shown in FIGS. 1 and 2a, the plate is perpendicular to the plane Oxy. Nevertheless, it is possible to incline the plate 34 so that the angle between the surface thereof and the Oxy plane is less than 90°, e.g. equal to 87°. The same applies to the elements in the form of plane plates that are described below with reference to FIGS. 2b, 3a, 4a, 5a to 5d and 7a to 7d.

The plate is at a distance from the side walls 30 and 32 of the apparatus and it is secured to a support 36 disposed in the Oxz plane and present in the form of a plane rectangular base (FIG. 2a). The two opposite ends 36a and 36b of the base 36 in the Oz direction are fixed to the top and bottom walls respectively of the apparatus 10 (not shown in the figures) which are perpendicular to the side walls 30 and 32.

The plate 34 is symmetrical about the midplane parallel to the plane Oxy. It is preferable for the extent of the plate 34 in a direction lying in the Oxy plane to be greater in its central portion than on either side thereof in the Oz direction in order to have most effect in the central portion of the flow.

As shown in FIG. 2a, the plate 34 has a rectangular base connected to the base 36 and it extends away therefrom in a triangular shape, with the tip of the triangle being situated halfway up said plate. In addition, the plate 34 is asymmetrical relative to the Oxz plane, and forms an angle θ therewith, and thus also with the local direction of the flow (FIGS. 1 and 2a). Such a plate reduces the speed of the flow in the center thereof along the Oz direction. If the plate 34 is placed in the Oxz plane, then the speed of the flow is reduced, but by a lesser amount. It should be observed that the greater the extent of the plate 34 in the direction contained in the Oxy plane, the smaller the angle θ needs to be in order to avoid excessively reducing the speed of the flow at mid-height, since that would attenuate the beneficial effect of the plate on the speed profile of the flow.

Figure 2B:
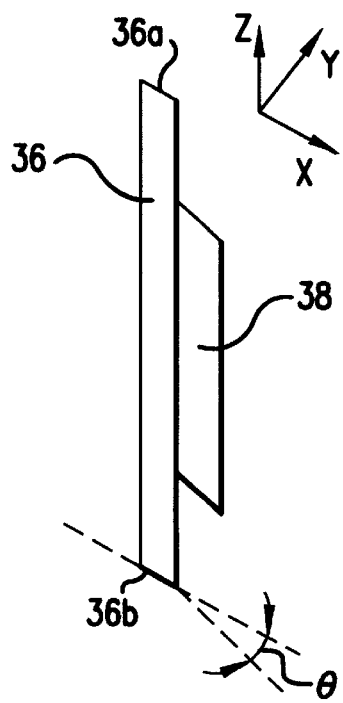

As shown in FIG. 2a, the extent of the plate 34 in the Oz or height direction is more or less equal to the height of the measurement apparatus 10 at the location where the plate is installed. Nevertheless, it is also possible to design a plate 38 whose extent along the Oz direction is smaller than the local height of the measurement apparatus 10, as shown in FIG. 2b. Thus, on either side of the plate 38 in the Oz direction, two gaps are left empty for the flow situated close to the bottom and top walls (not shown) to ensure that the plate has a direct effect only on the central portion of the flow.

Figure 2C:
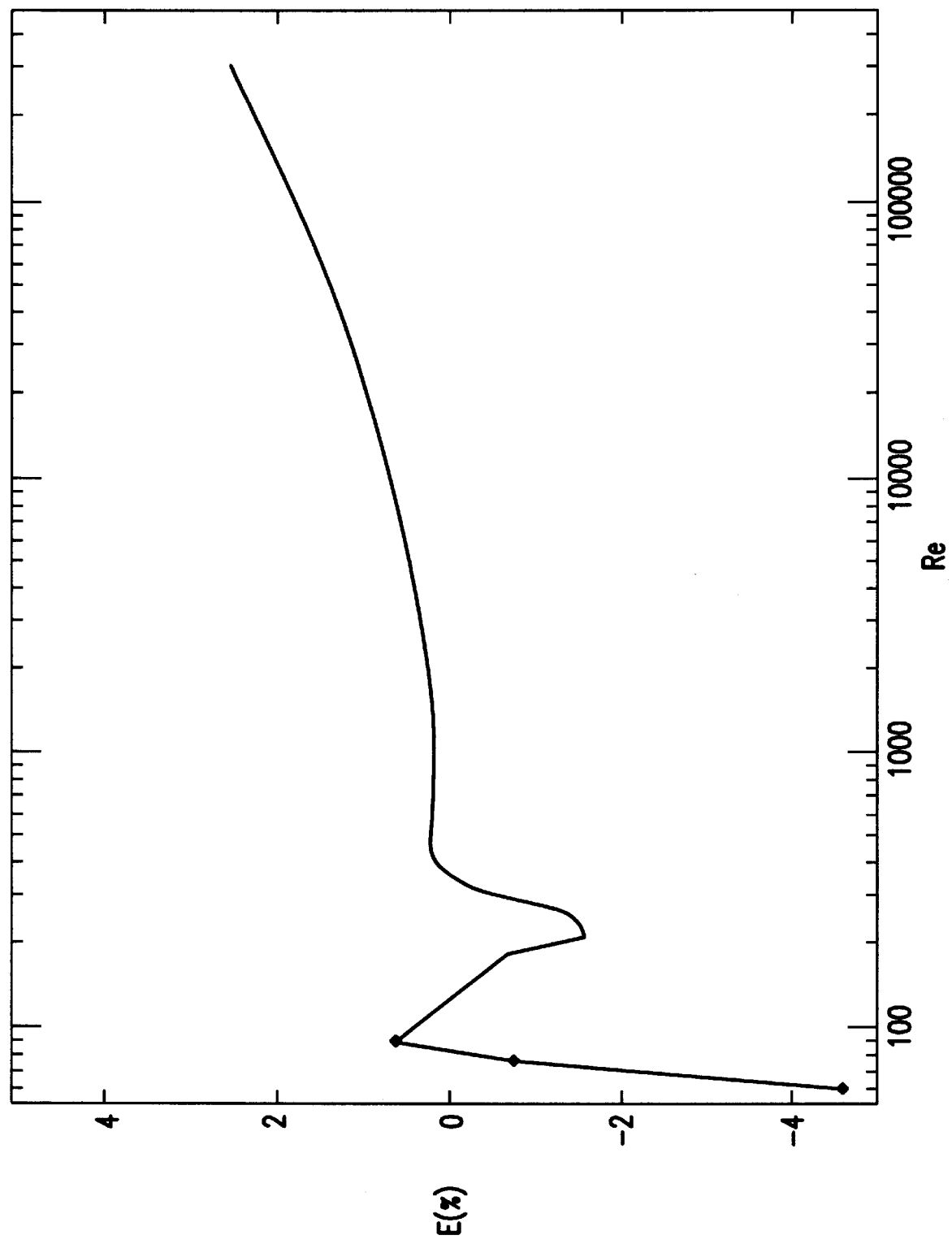
FIG. 2c is an error curve showing E as a function of Reynolds number as obtained at the slot 14 of the measurement apparatus of FIG. 1.

FIG. 2c shows the general trend of the error curve as a function of Reynolds number for the flow as measured by apparatus using a fluidic oscillator and in which the speed in the center of the flow along the Oz direction was reduced. With measurement apparatus as shown in FIGS. 1 and 2a, and by optimizing the various parameters thereof in routine manner, the person skilled in the art can obtain flow rate measurement error that is smaller than ±2% over a wide range of Reynolds numbers, running from 70 to 100,000, with an error that is smaller than ±1% over a smaller range lying between 300 and 10,000.

The Assignee has observed that by placing a plane plate in the flow, as described above with reference to FIGS. 1, 2a, and 2b, the energy contained in said flow at the slot 14 increases, thereby increasing the frequency of oscillation of the apparatus.

Figure 3A:
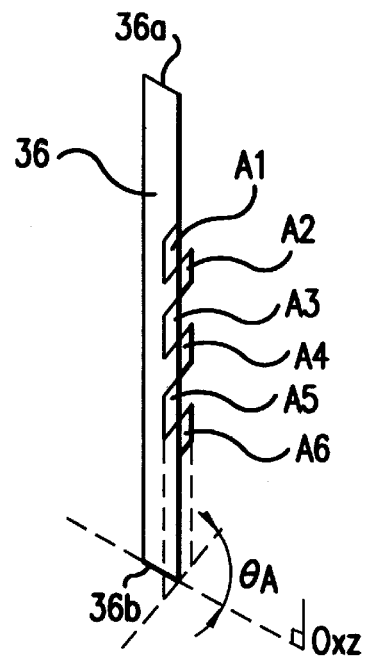
FIG. 3a is a perspective view of a second variant of FIG. 2a and shows a plurality of elements forming obstacles to the flow.

In a variant, FIG. 3a shows a plurality of elements $A_i$ for i=1 to 6, each element being in the form of a substantially plane plate forming an obstacle to the flow. These elements are secured to a support 36 identical to that of FIG. 2a and they are distributed along the Oz axis in such a manner that two consecutive elements $A_i$ and $A_{i+1}$ are offset angularly relative to each other. As shown in FIG. 3a, two consecutive elements $A_i$ and $A_{i+1}$ are each at an angle $\pm\theta_A$ relative to the plane Oxz. In this example, the angle $\theta_A$ is wide open, but the extent of the element $A_i$ in a direction contained in the Oxy plane is small and identical for all of the elements. If this extent were too great, that would have the effect of modifying the speed profile excessively and of creating turbulent flow which would run the risk of disturbing the jet oscillation phenomenon.

It should also be observed that two consecutive elements $A_i$ and $A_{i+1}$ may form respective angles of different absolute value relative to the Oxz plane.

The elements $A_i$ are remote from the ends 36a and 36b of the support 36 and thus from the top and bottom walls of the measurement apparatus, thereby forming an obstacle to the flow solely in the central portion thereof and leaving top and bottom empty gaps for the flow where situated closer to said top and bottom walls.

Figure 3B:
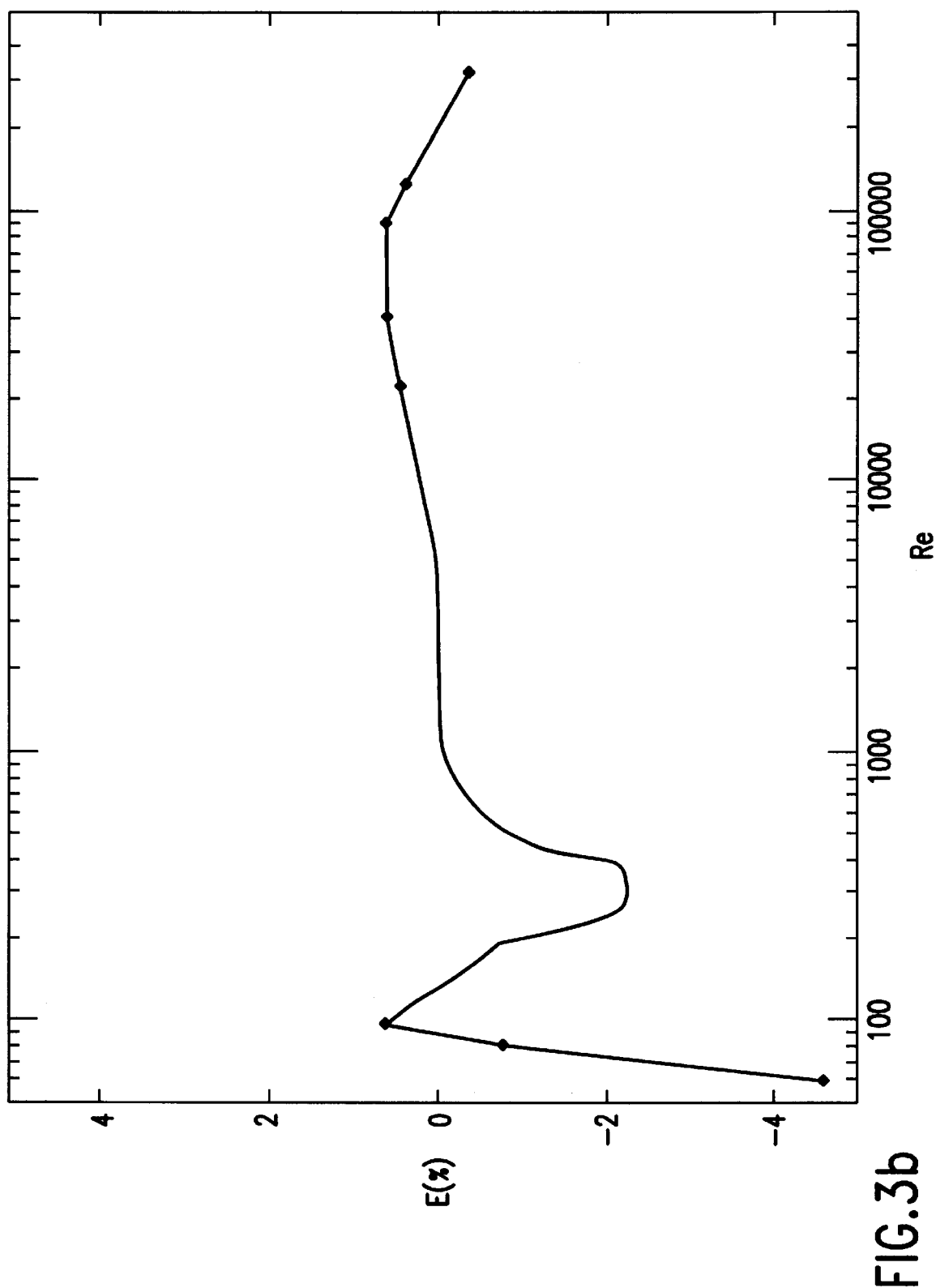

FIG. 3b shows the general trend of the error curve as a function of Reynolds number for the flow obtained with measurement apparatus as shown in FIG. 1 and having the element of FIG. 2a replaced by elements $A_i$ of FIG. 3a. By optimizing the various parameters of the apparatus in routine manner, the person skilled in the art can obtain a measurement error on flow rate that is smaller than ±0.5% over a range of Reynolds numbers extending from 900 to 300,000, with error lying in the range ±2.5% for Reynolds numbers lying in the range 70 to 900.

Figure 4A:
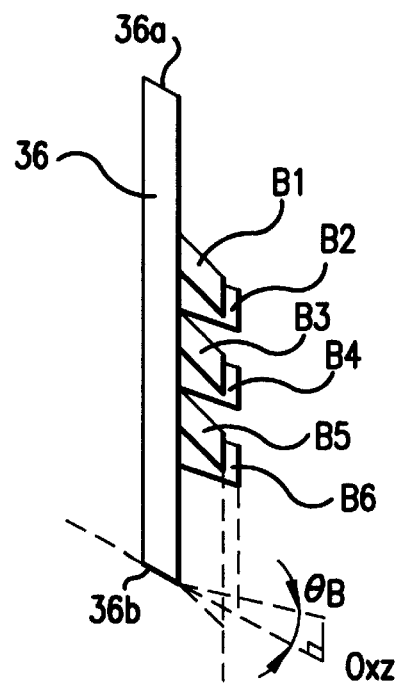
FIG. 4a is a perspective view of a third variant of FIG. 2a and shows a plurality of elements forming obstacles to the flow.

In a third variant embodiment shown in FIG. 4a, a plurality of substantially plane plate elements $B_i$ for i=1 to 6 are distributed along the Oz direction on a support identical to the support 36 of FIG. 2a in a manner analogous to the elements $A_i$ of FIG. 3a. However, the elements $B_i$ are of identical dimensions to one another and they extend in a direction contained in the Oxy plane further than do the elements $A_i$ of FIG. 3a. In addition, each of the elements $B_i$ forms an angle $\theta_B$ relative to the Oxz plane that is smaller than the angle $\theta_A$ of FIG. 3a. Given the larger dimensions of the elements $B_i$, too great an angle $\theta_B$ would run the risk of increasing error at low flow rates. The absolute value of the angle $\theta_B$ may be the same for all of the elements $B_i$ as shown in FIG. 4a, or it may differ between two consecutive elements $B_i$ and $B_{i+1}$.

Figure 4B:
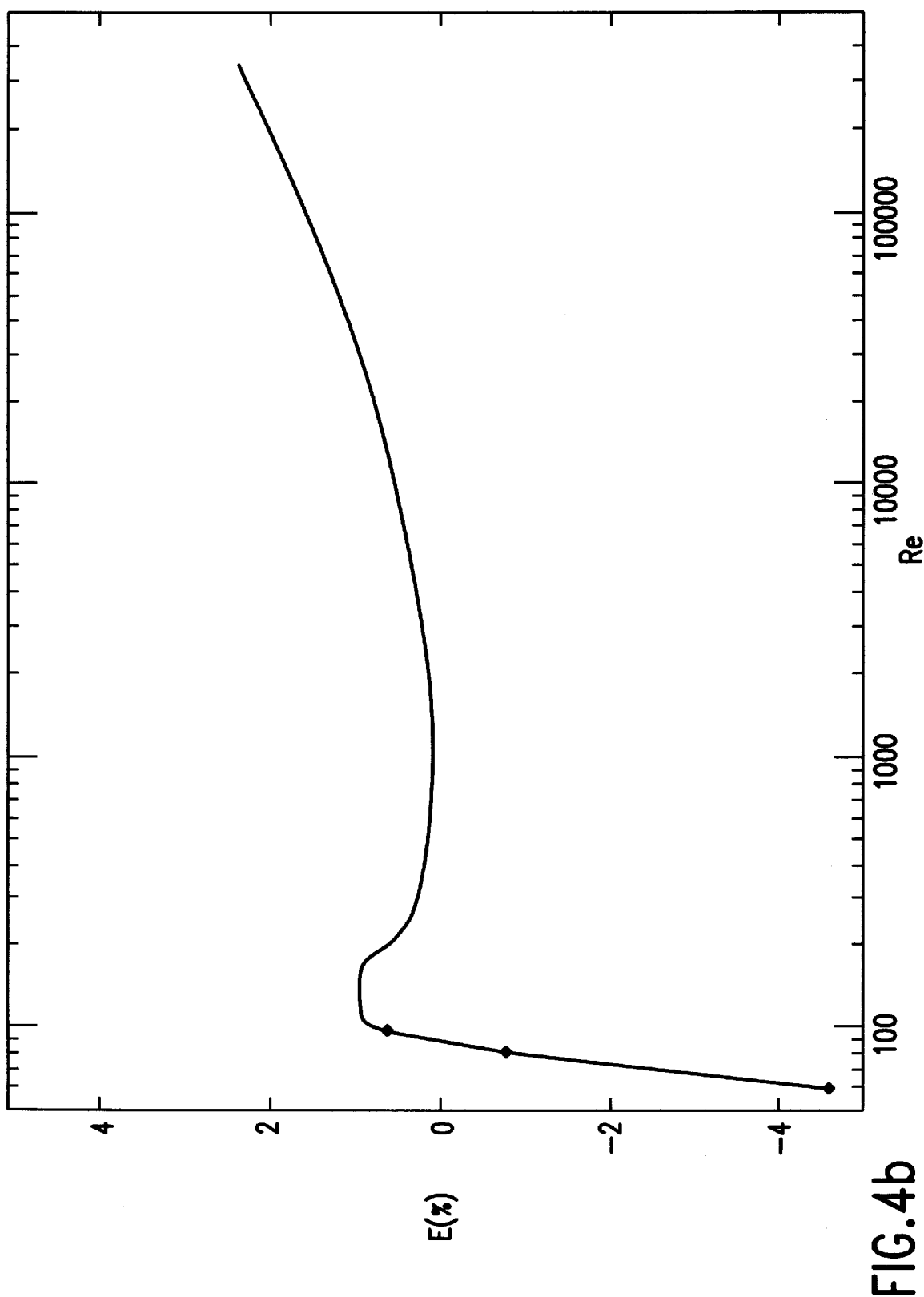

FIG. 4b shows the general trend of the error curve as a function of Reynolds number for the flow as obtained with measurement apparatus as shown in FIG. 1 and in which the element of FIG. 2a is replaced by the elements $B_i$ of FIG. 4a. By optimizing the various parameters of the apparatus in routine manner, the person skilled in the art can obtain a measurement error that is smaller than ±2% over a range of Reynolds numbers extending from 70 to 100,000, and smaller than ±1% over the range 80 to 10,000.

In a fourth variant embodiment shown in various different views in FIGS. 5a, 5b, and 5c, a plurality of substantially plane shaped elements $C_i$ for i=1 to 10 are distributed along the Oz axis on a support identical to the support 36 described with reference to FIG. 2a. Two consecutive elements $C_i$ and $C_{i+1}$ are angularly offset relative to each other and do not necessarily form an angle having the same absolute value relative to the Oxz plane. The dimensions of the elements $C_i$ vary depending on position along the Oz axis. Elements having the greatest extent in a direction contained in the Oxy plane are referred to as "central" elements $C_3$, $C_4$, $C_6$, $C_8$, and $C_9$ and they are disposed in such a manner as to exert their influence in the central portion of the flow, mainly for low Reynolds numbers. These central elements form relatively small angles with the Oxz plane, e.g. 11° for the elements $C_3$ and $C_6$, and 14° for $C_4$ (FIG. 5b).

Figure 5A:
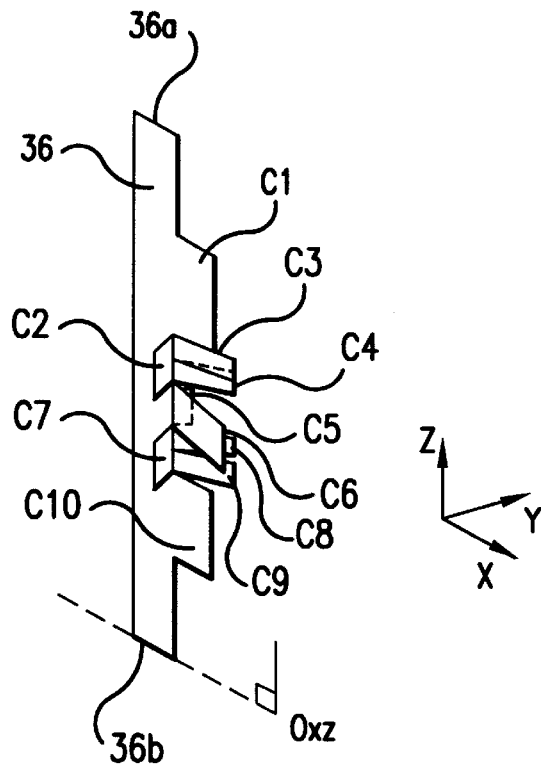
FIG. 5a is a perspective view of a fourth variant of FIG. 2a and shows a plurality of elements forming obstacles to the flow.
Figure 5B:
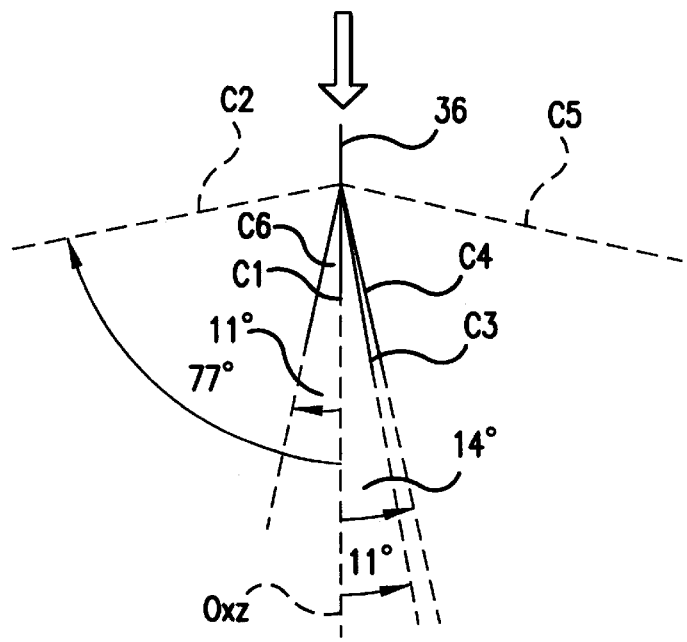
FIG. 5b is a plan view of the FIG. 5a elements.

Other elements $C_2$, $C_5$, and $C_7$ also exert an influence on the central portion of the flow, but mainly for large Reynolds numbers, and these elements are constituted by plates of small extent in a direction contained in the Oxy plane and forming very large angles with the Oxz plane, e.g. 77° for all three elements (FIG. 5b). By way of example, the elements $C_2$, $C_5$, and $C_7$ extend in a direction contained in the Oxy plane by an amount equal to 0.32d where d is the width of the slot 14, while the elements $C_3$, $C_4$, $C_6$, $C_8$, $C_9$ extend in the same direction by an amount which is equal to 1.16d.

The distance between the side of the base 36 to which the various elements $C_i$ (for i=1 to 10) are connected and the slot 14 is shown in FIG. 1 and may be equal to 2.45d, for example. The elements must not be placed too close to the slot 14 and they must certainly not be placed in the slot since that would run the risk of greatly disturbing fluid jet formation. A minimum distance of not less than d from the slot is suitable.

Figure 5C:
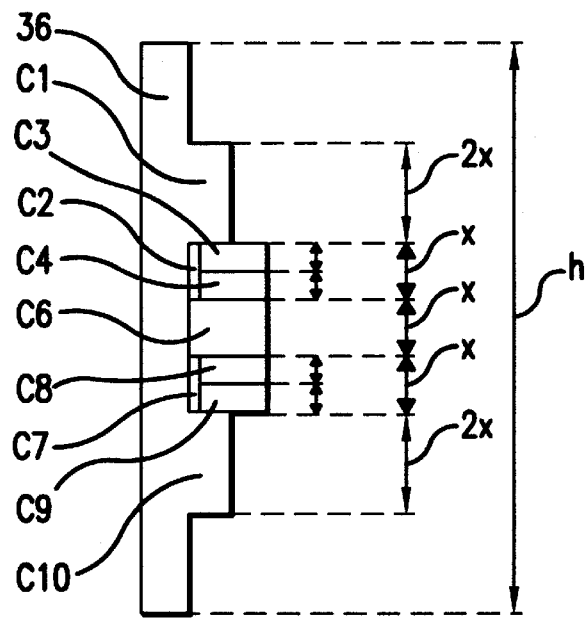
FIG. 5c is a side view of the FIG. 5a elements.

FIG. 5c shows the extent in the height or Oz direction of each of the elements $C_1$ as a function of x, where x is equal to 0.096h, for example, h being the local height of the measurement apparatus 10. By way of example, h lies in the range 3d to 10d and d may be equal to 10 mm, for example.

Figure 5D:
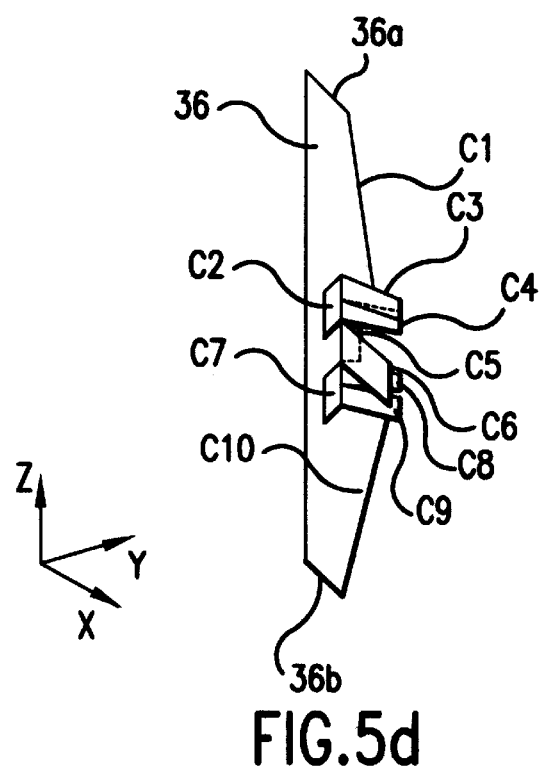
FIG. 5d is a perspective view of a variant of the FIG. 5a elements.

The elements $C_1$ and $C_{10}$ disposed on either side of the central elements along the Oz axis are situated in the Oxz plane. In a manner analogous to that shown in FIGS. 2b, 3a, and 4a, and for the same reasons, two empty gaps are left between the elements $C_1$ and $C_{10}$ and the corresponding top and bottom walls of the measurement apparatus. Nevertheless, it is possible for the shape of the elements $C_1$ and $C_{10}$ to be such that their extent in a direction contained in the Oxy plane increases progressively from the respective ends 36a and 36b of the support so that they occupy the above-mentioned empty gaps partially (FIG. 5d).

Figure 6A:
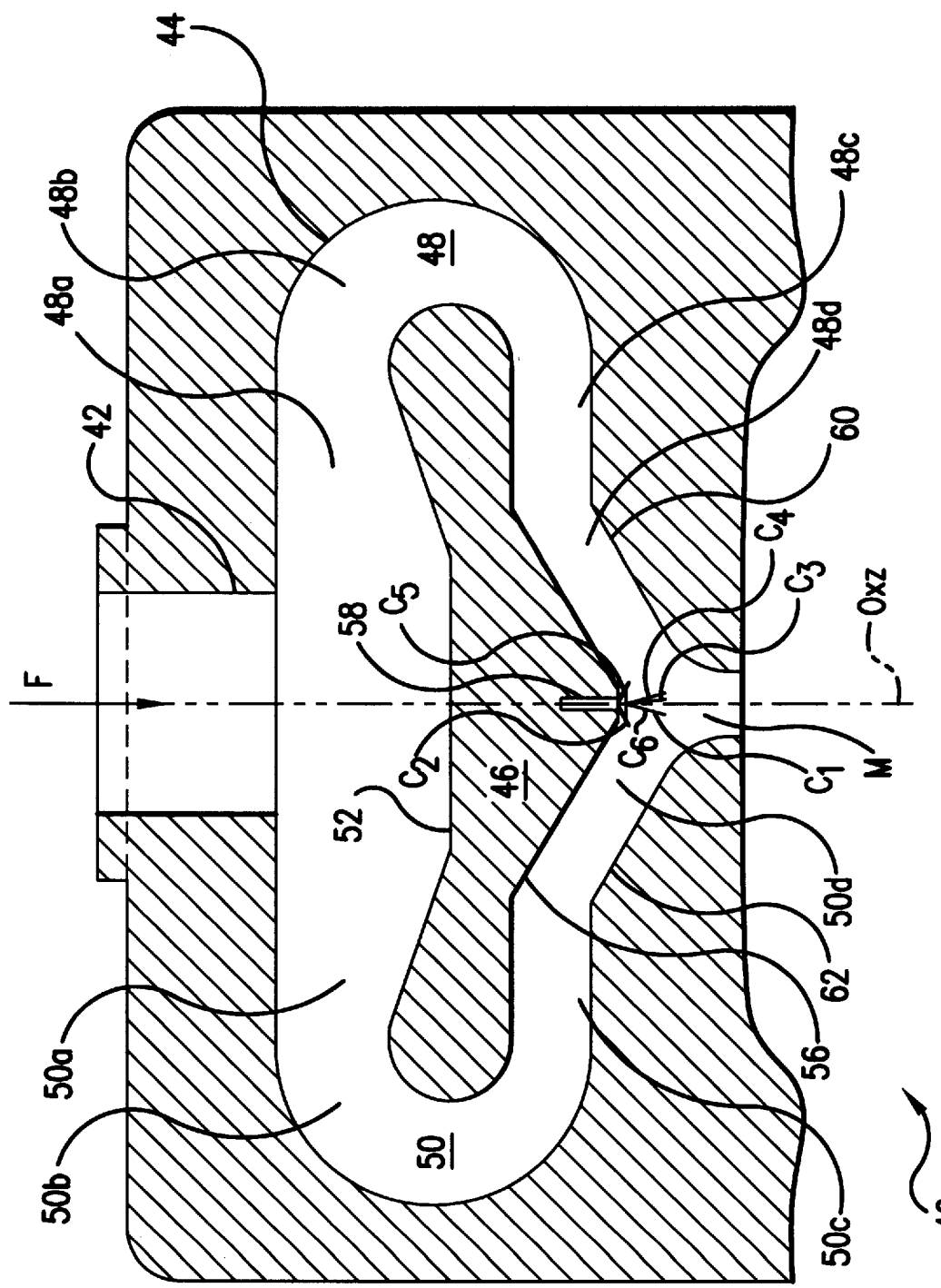
FIG. 6a is a plan view of measurement apparatus constituting a second embodiment of the invention.

FIG. 6a is a plan view of a second embodiment of measurement apparatus 40. This figure shows the portion of the measurement apparatus that is situated upstream from the fluidic oscillator. The fluidic oscillator may be the same as that shown in FIG. 1, for example.

The flow of gas whose direction is represented by arrow F penetrates via an inlet 42 of circular cross-section into an enclosure 44 containing an obstacle 46 which co-operates with the wall of the enclosure to form two passages 48 and 50 that are symmetrical about the Oxz plane. This structure constitutes a flow conditioner for the gas and is described in detail in as-yet unpublished French patent application No. 95/01425. The flow coming from the inlet 42 strikes the front surface 52 of the obstacle 46 and is split against said surface, thereby transforming the longitudinal direction of the mean speed of said flow into transverse components. The two fractions of the flow travel in substantially symmetrical manner along respective converging portions 48a and 50a of the passages 48 and 50.

Thereafter, each flow fraction follows a first bend 48b or 50b through 180°, and then a second bend 48c or 50c, prior to being channeled via a straight portion 48d or 50d of the corresponding passage to a mixing zone M where the two flow fractions reunite. The mixing zone M is situated upstream from the slot 54 of the fluidic oscillator which is not shown in this figure.

The rear portion 56 of the obstacle 46 is pointed in shape and has an elongate groove 58 in the Oz direction formed therein to receive the base 36 on which the elements $C_i$ for i=1 to 10 of FIGS. 5a to 5c are fixed. The elements $C_i$ are shown in FIG. 6a in a manner analogous to the way in which they are shown in FIG. 5b.

Figure 6B:
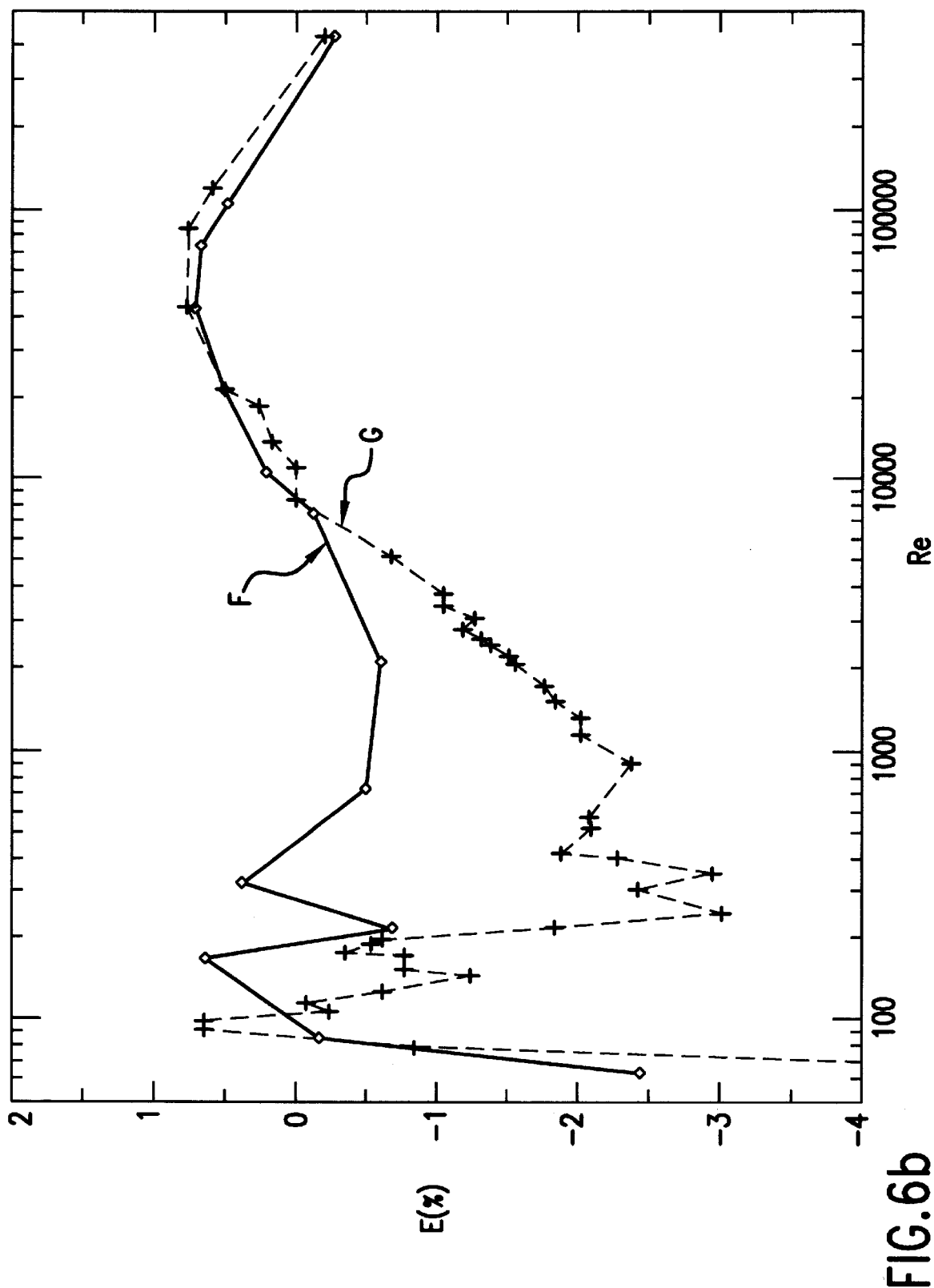
FIG. 6b shows two error curves as a function of flow rate obtained with the measurement apparatus of FIG. 6a, one with the elements $C_i$ and the other without said elements.
Figure 6C:
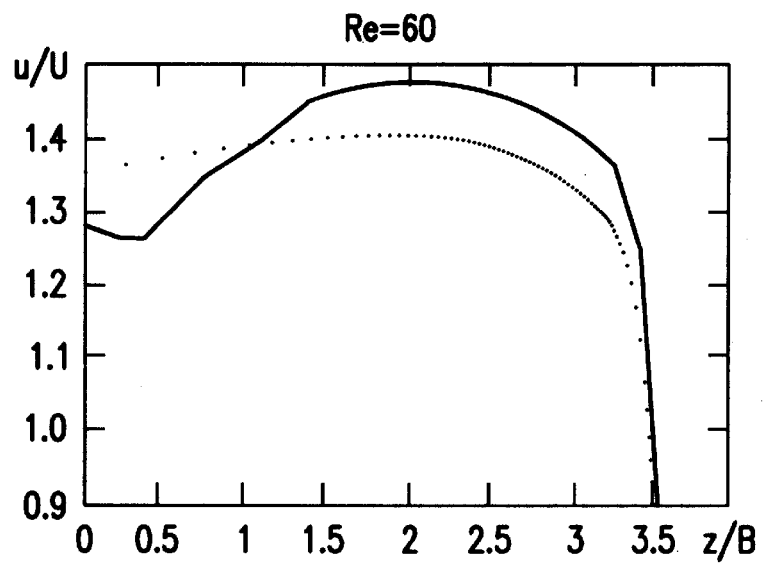
FIGS. 6c to 6h show various Oz directions profiles of speed distribution in the flow at the slot, obtained with the FIG. 6a measurement apparatus, and respectively for Reynolds numbers of 60, 150, 400, 1,000, 10,000, and 100,000.
Figure 6D:
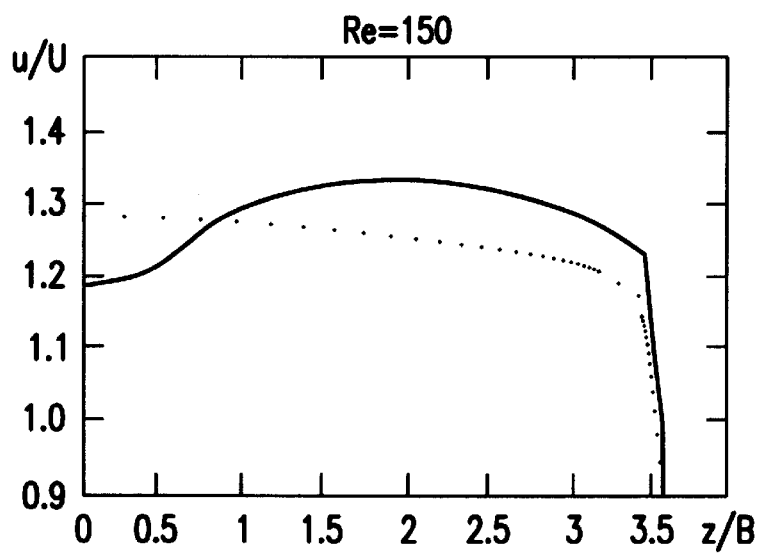
Figure 6E:
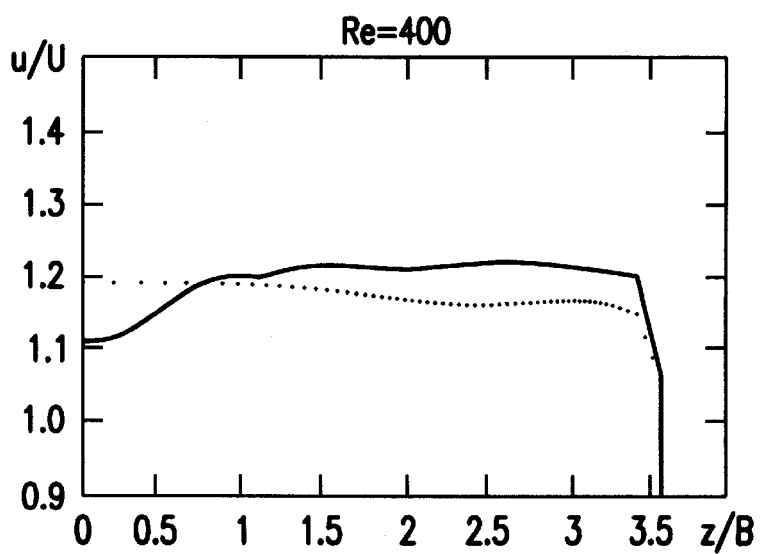
Figure 6F:
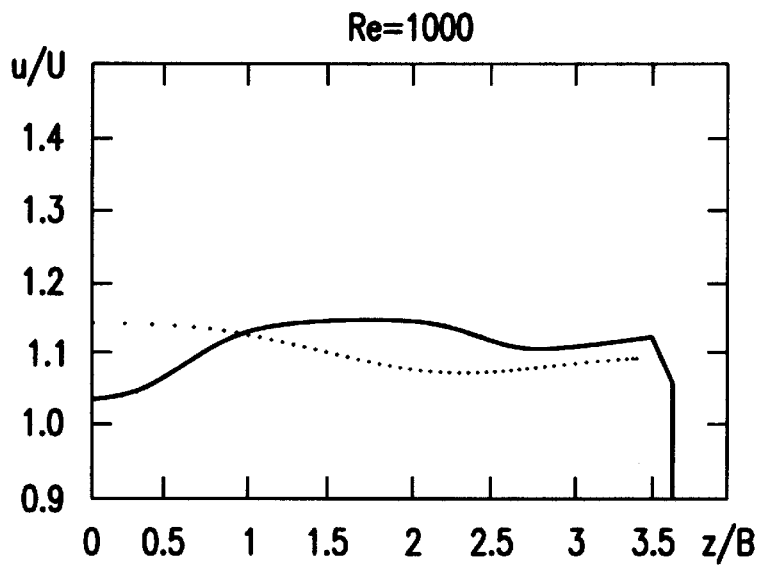
Figure 6G:
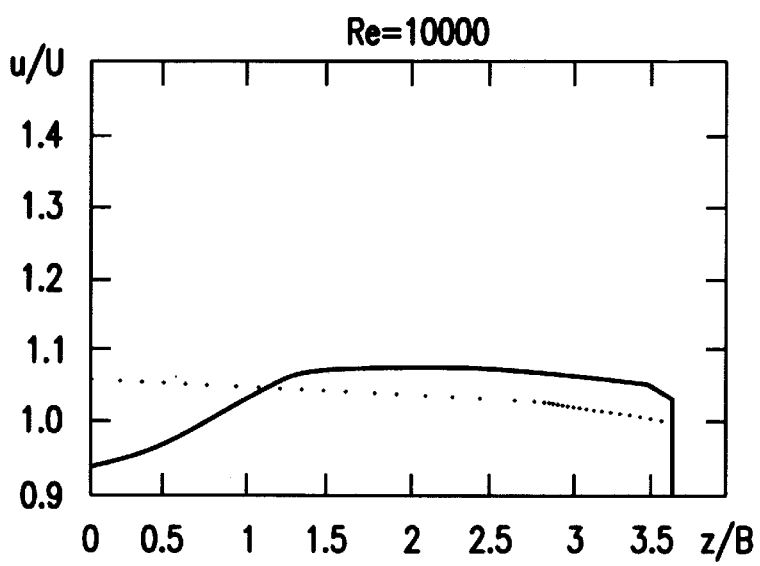
Figure 6H:
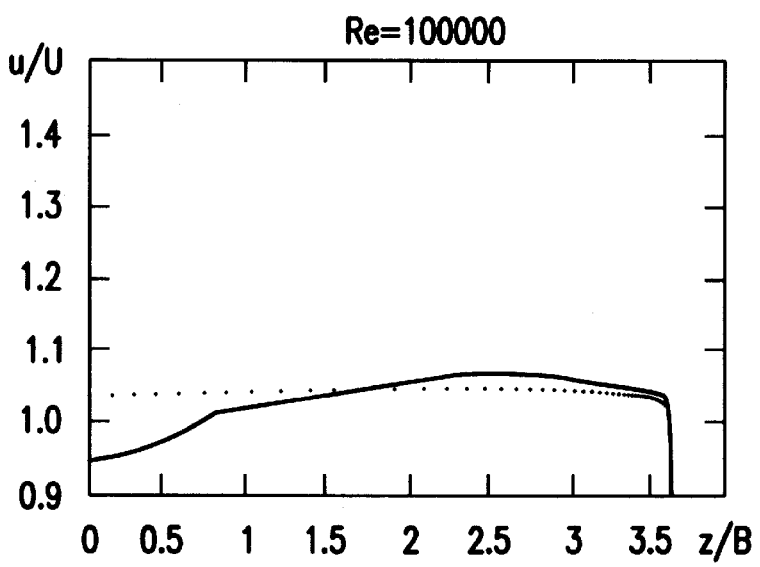

FIG. 6b shows two error curves as a function of Reynolds number obtained with the measurement apparatus of FIG. 6a, one of the curves (F) being obtained with elements $C_i$, and the other curve (G) being obtained without said elements. Thus, for a range of Reynolds extending from 70 to 300,000, the error on flow rate measurement shown by curve F is smaller than ±1%.

Given the very good results obtained over a wide range of Reynolds numbers with the measurement apparatus of the invention, it is possible to cover a range of flow rates extending, for example, from 0.25 m³/h to 40 m³/h, thus giving a dynamic range of 160. Similar results are obtained when the elements $C_i$ of FIG. 5a are disposed in the flow as shown in FIG. 1, replacing the plate 34. It should also be observed that with the elements $C_i$ of FIG. 5a, the errors in flow rate measurement at low values of Reynolds number are smaller than those obtained with the prior art measurement apparatus described in document FR 2 663 417. The prior art apparatus cannot cover a Reynolds number range of 50 to 10,000. Although the metal screen used in the prior art apparatus has a very fine mesh for adapting to small Reynolds numbers, its headlosses are very high at large Reynolds numbers. In addition, the very fine mesh rapidly gives rise to contamination problems.

Measurement apparatus fitted with elements $A_i$ of FIG. 3a provides very good results at high Reynolds numbers.

Measurement apparatus fitted with elements $B_i$ of FIG. 4a produces very good results at low Reynolds numbers.

For different values of Reynolds number, FIGS. 6c to 6h show half of the flow speed profile on the Oz axis (the other half being symmetrical about the ordinate axis in each of the figures) as obtained in the slot 14 of FIG. 1, with the element 34 of FIG. 1 being replaced by the elements $C_i$ of FIG. 5a. In each case, the dotted curve represents the speed half-profile obtained in the absence of elements forming an obstacle in the flow upstream from the slot. The continuous line curves thus show that the elements $C_i$ which form obstacles to the flow serve to reduce the flow speed in the center thereof along the Oz axis to a considerable extent over a range of Reynolds numbers extending from 60 to 100,000. By comparing FIGS. 6c to 6h, it can be seen that the general appearance is that of a central dip with two peripheral humps for all of the Reynolds numbers given in the presence of the elements $C_i$. In contrast, when the elements $C_i$ are absent, increasing Reynolds number causes the speed profile of the flow to change from a substantially parabolic profile to a substantially flat profile. It can be seen that the elements $C_i$ enable the speed of the flow to be increased close to the walls in the Oz direction. This is due to the fact that since the speed is reduced in the center of the flow it is redistributed along the Oz axis towards the sides.

Figure 7A:
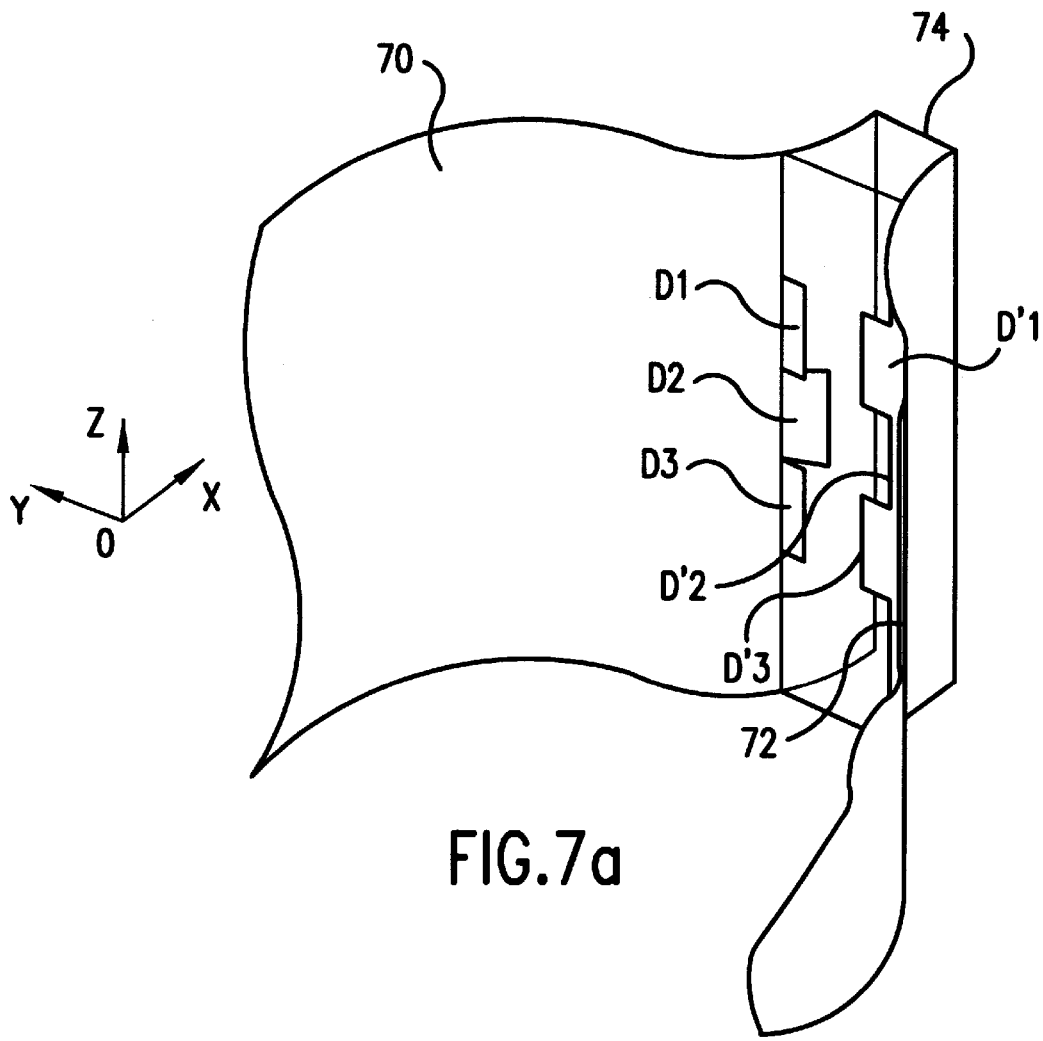
FIG. 7a is a perspective view of measurement apparatus constituting a third embodiment of the invention.
Figure 7B:
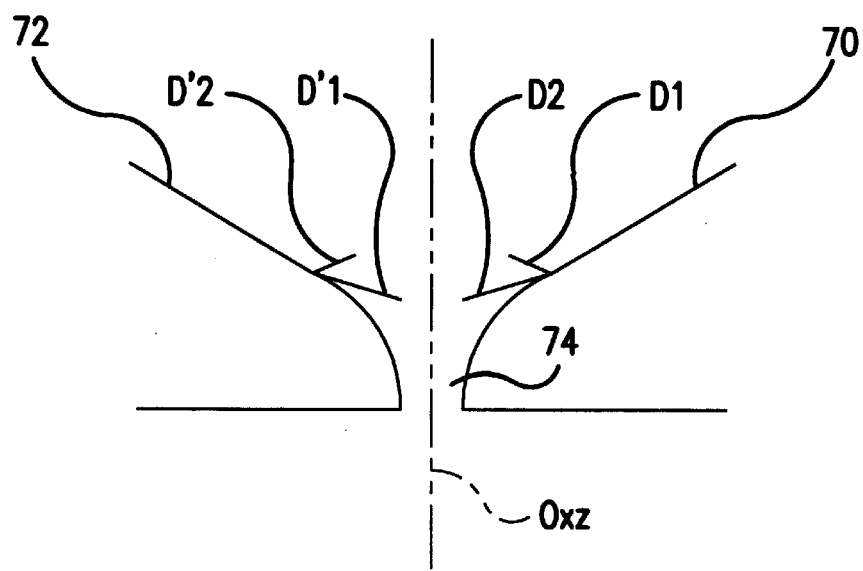
FIG. 7b is a plan view of the FIG. 7a apparatus.

It should be observed that the elements forming obstacles to the flow can be connected to one or other of the two side walls 30 and 32 of FIG. 1 or indeed to the side walls 60 and 62 of FIG. 6a, for example. As shown in FIGS. 7a and 7b, elements $D_i$ and $D'_i$ forming obstacles to the flow are provided on the side walls 70 and 72 of the measurement apparatus shown in part in said figure, upstream from the slot 74. The measurement apparatus may include the fluidic oscillator of FIG. 1, for example.

The elements $D_i$ (and likewise $D'_i$) for i=1 to 3 are in the form of plane plates distributed along the Oz direction with consecutive plates being angularly offset from one another. By way of example, the plates are mounted on a support analogous to the support 36 of the preceding figures and received in respective grooves (not shown) formed in each of the walls 70 and 72.

The elements $D_i$ and $D'_i$ are symmetrical about the Oxz plane, but they could equally well be asymmetrical. For example, the elements $D_1$ and $D_3$ (and likewise $D'_1$ and $D'_3$) are analogous to the elements $A_i$ of FIG. 3a, while the element $D_2$ (and $D'_2$) are analogous to the elements $B_i$ of FIG. 4a. Other configurations, e.g. those shown in FIGS. 5a and 5d, could also be envisaged. The elements $D_1$ and $D_3$ (and likewise $D'_1$ and $D'_3$) may, for example, be identical to each other, thereby conferring symmetry to the elements $E_i$ (and $D'_i$) about a midplane parallel to the Oxy plane, or they may be different.

In analogous manner to that shown in FIGS. 3a, 4a, and 5a, and for the same reasons, two empty gaps are left between the side elements $D_1$, $D_3$ (and likewise $D'_1$ and $D'_3$) and the top and bottom walls of the measurement apparatus.

The elements shown in FIGS. 7a and 7b thus make it possible to reduce the flow speed mainly in the central portion of the Oz direction.

It should be emphasized that the elements shown in FIGS. 2a, 2b, 3a, 4a, 5a to 5d, 6a, 7a, and 7b are not necessarily symmetrical about the midplane parallel to the Oxy plane.

Figure 8A:
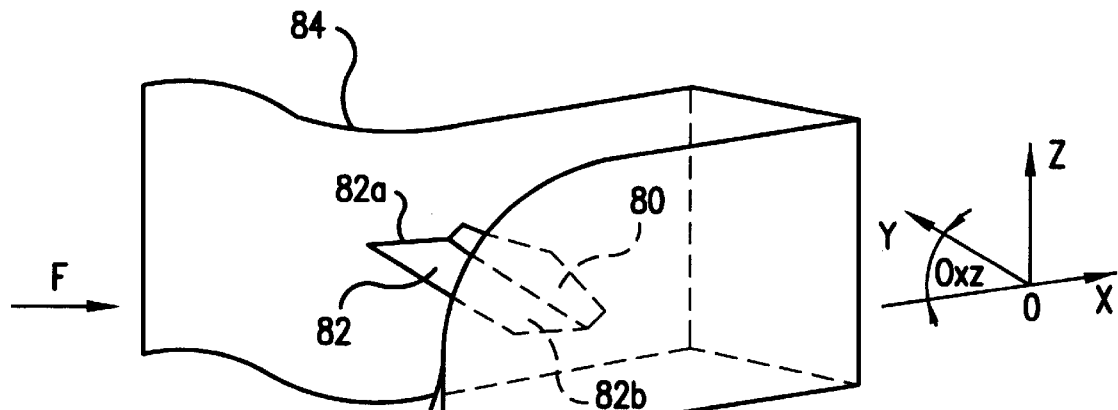
FIG. 8a is a perspective view of measurement apparatus constituting a fourth embodiment of the invention.

In a fourth embodiment of the invention shown in FIG. 8a, the plate-shaped element 80 is substantially perpendicular to the Oxz plane. The element is secured to a support 82 which is likewise in the form of a base disposed parallel to the Oxy plane so as to offer as little resistance as possible to the flow which is represented by the arrow marked F. The support is mounted by means of its two opposite ends 82a and 82b to the side walls 84 and 86 of the apparatus situated upstream from the slot 82 and substantially halfway up the apparatus. By way of example, the ends 82a and 82b may be received in two respective grooves formed in the side walls 84 and 86.

Figure 8B:
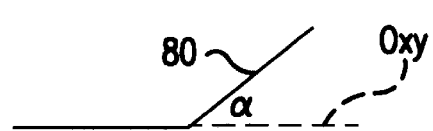
FIG. 8b is a fragmentary side view of the FIG. 8a apparatus.

The plate-shaped element forms a predetermined angle α with the Oxy plane, thereby presenting the flow with a certain contact area, thus enabling the speed profile to be modified mainly in the central portion thereof (FIG. 8b). This element serves to reduce the flow speed in the center of the flow along the Oz direction.

The element 80 of FIG. 8a is analogous to that of FIG. 2a. This element may likewise be replaced by the element or elements shown in FIGS. 2b, 3a, 4a, and 5a which would then be disposed substantially perpendicularly to the Oxz plane.

Figure 8C:
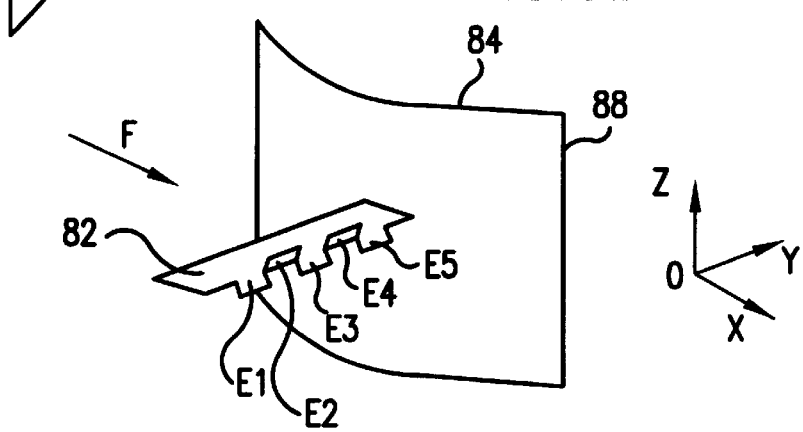
FIG. 8c is a fragmentary perspective view of a variant embodiment of the FIG. 8a device seen from a different angle.

By way of example, FIG. 8c is a view at a different angle from FIG. 8a showing one such variant in which the elements $E_i$ for i=1 to 5, analogous to the elements $A_i$ of FIG. 3, replace the element 80 of FIG. 8a.

Figure 8D:
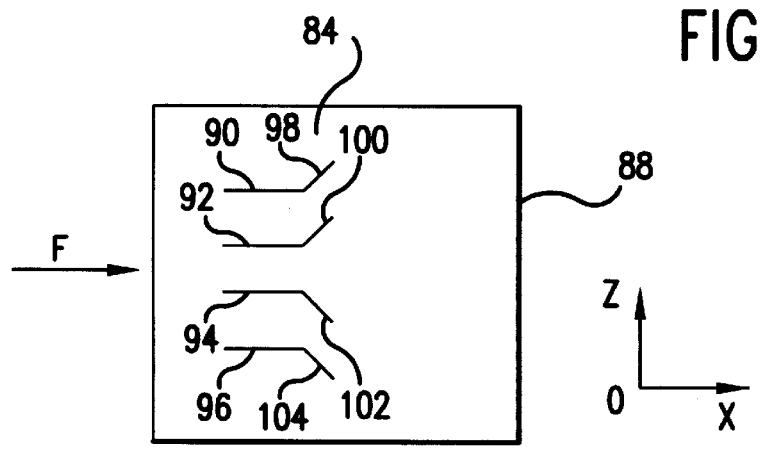
FIG. 8d is a fragmentary side view of another variant embodiment of the FIG. 8a device.

FIG. 8d shows another variant in side view of measurement apparatus in which a plurality of mutually parallel bases 90, 92, 94, and 96 are placed substantially perpendicularly to the Oxz plane and parallel to the Oxy plane. These bases are mounted between the side walls 84 and 86 of the apparatus upstream from the slot 82 and they serve as supports for elements 98, 100, 101, 104 in the form of plane plates secured thereto. Each of the elements 98–104 forms a predetermined angle with the Oxy plane, the angles being identical for each of the pairs 98–100 and 102–104.

Figure 9:
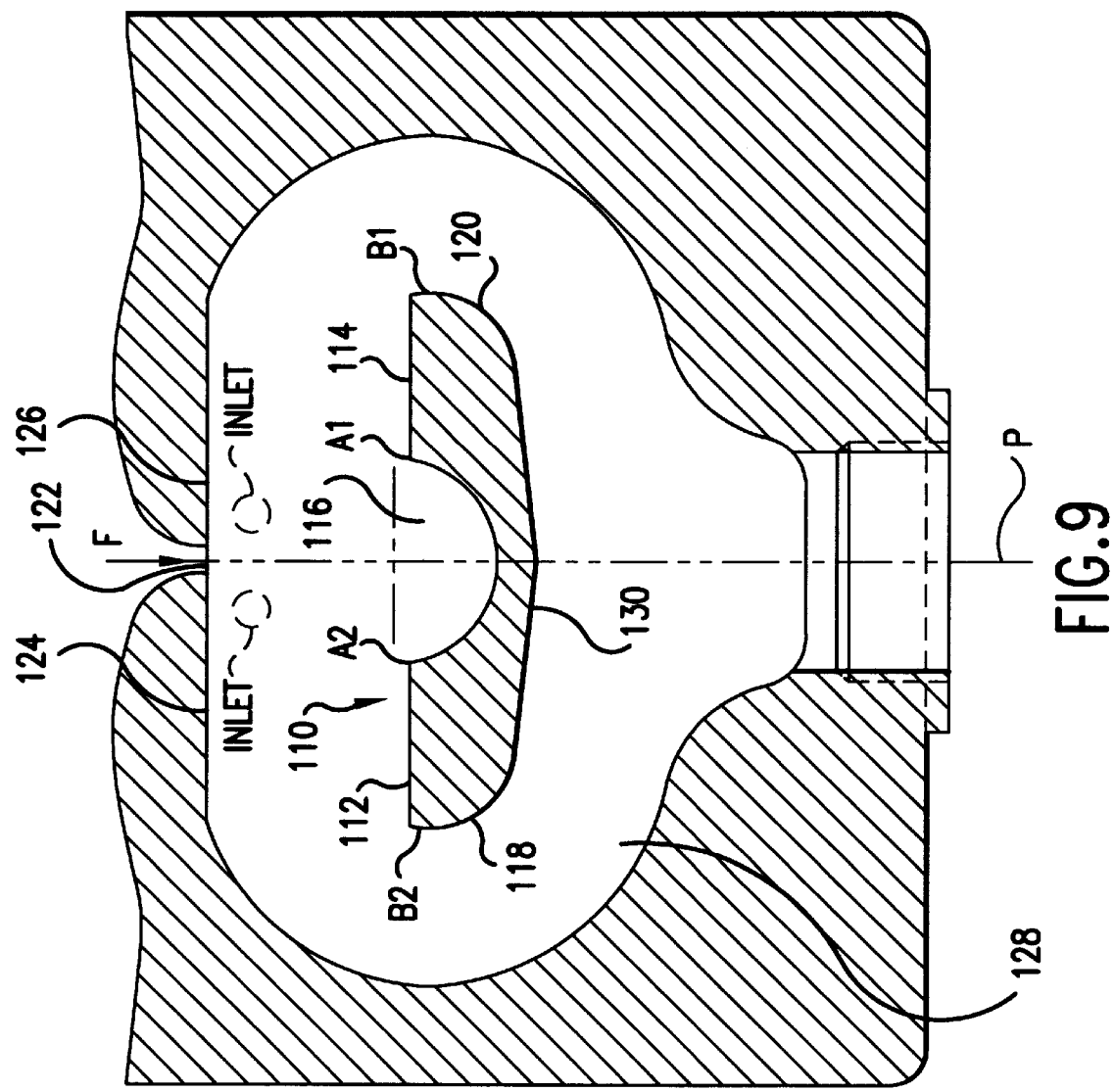
FIG. 9 is a plan view of another fluidic oscillator used in the measurement apparatus of the invention.

By way of example, in all these variants of FIGS. 8a to 8d, the fluidic oscillator disposed downstream from the slot 82 may be the oscillator shown in FIG. 1, or it may be the oscillator shown in FIG. 9.

The fluidic oscillator shown in FIG. 9 is described in French patent application No. 96/03315 filed on Mar. 15, 1996 in the name of the Assignee, and not yet published. This fluidic oscillator differs from that of FIG. 1 by the fact that the front wall of the obstacle 110 has two essentially plane front surfaces 112 and 114 on either side of the cavity 116, the plane of each surface being substantially perpendicular to the longitudinal plane of symmetry P of the oscillator. The cavity 116 of the oscillator is defined by a surface which is substantially parallel to the plane of symmetry at the locations A1 and A2 where said surface meets each of the front surfaces 112 and 114. The obstacle 110 also has two side walls 118 and 120 whose side surfaces are substantially parallel to the plane of symmetry at locations B1 and B2 where each of them meets the corresponding front surface 112, 114.

On either side of the slot 122, the walls 124 and 126 defining the oscillation chamber 128 have surfaces that are substantially parallel to the front surfaces.

The rear portion 130 of the obstacle is substantially plane and much shorter than that of the obstacle shown in FIG. 1.

This fluidic oscillator configuration makes it possible to obtain main vortices of radial extent (distance between the center of the vortex and its periphery) that increases with increasing Reynolds number, thereby contributing to reducing the oscillation frequency of the jet. With this configuration, turbulence develops much more freely than in the configuration shown in FIG. 1. Also, such a fluidic oscillator is simpler to manufacture, thus making it possible to achieve better measurement repeatability.

The elements in the form of plane plates and shown in FIGS. 8a to 8d can serve to avoid the contamination problems encountered in the prior art, and in particular in the apparatus described in document FR 2 663 417, while still forming an obstacle to flow for the purpose of modifying the speed profile thereof in controlled manner. It should be specified that these elements favor direct redistribution of the profile of speeds in the flow along the Oz direction, whereas the elements shown in FIGS. 1, 2a, 2b, 3a, 4a, 5a to 5d, 6a, 7a, and 7b begin by redistributing speed profile in planes parallel to the Oxy plane and subsequently along the Oz direction.

In this case also, the dimensions of the elements in the form of plane plates and the angles at which said elements are inclined relative to the Oxy plane are related to one another for the same reasons as those given above when describing FIGS. 3a, 4a, and 5a. Thus, the angle of inclination of any such element increases with decreasing area of the element constituting an obstacle to the flow.

The elements shown in FIGS. 8a to 8d are not necessarily symmetrical about the longitudinal plane Oxy nor even about the Oxz plane.

By way of example, the elements of the invention forming obstacles to the flow may be obtained by cutting and folding substantially plane metal sheet and are thus formed integrally with their support.

It is also possible for the elements forming obstacles to the flow and the support to constitute at least two separate parts.

It has been observed that the element(s) in the form of plane plate(s) disposed in the flow upstream from the slot and as described with reference to any preceding figure contribute(s) to minimizing the influence of changes of flow conditions (laminar-transitional-turbulent) on the calibration curve of the corresponding measurement apparatus. This can be seen in particular from FIG. 6b.

We claim:

1. Apparatus for measuring the flow rate of a fluid, the apparatus comprising a fluidic oscillator provided with an elongate slot in a direction Oz and suitable for forming a jet of fluid that oscillates in a plane Oxy perpendicular to said direction, and means located upstream from the slot to modify the distribution of speeds in the flow, wherein said means comprise at least one a plurality of elements each forming an obstacle to the flow at least in a central portion thereof and each being implemented in the form of a substantially plane plate, consecutive elements being angularly offset relative to one another, the fluid flowing along a direction Ox at said slot, said plurality of elements being distributed along a direction that is perpendicular to said direction Ox.

2. Apparatus according to claim 1, in which the elements in plate form are substantially perpendicular to the Oxy plane.

3. Apparatus according to claim 1, in which the elements forming an obstacle to the flow are symmetrical about the Oxz plane.

4. Apparatus according to claim 3, including side walls that are substantially perpendicular to the Oxy plane, that are symmetrical about the Oxz plane, and that guide the flow to the slot.

5. Apparatus according to claim 4, in which the elements element forming an obstacle to the flow is secured to at least one of the side walls of the apparatus.

6. Apparatus according to claim 1, in which the elements forming an obstacle to the flow are asymmetrical about the Oxz plane.

7. Apparatus according to claim 1, in which the elements forming an obstacle to the flow are secured to a support which is disposed in the fluid flow.

8. Apparatus according to claim 7, in which the support forms a flow conditioner for said apparatus and said conditioner splits the flow into two fractional flows which reunite in a zone situated substantially in the Oxz plane upstream from the slot.

9. Apparatus according to claim 8, in which the elements forming an obstacle to the flow are located in said zone.

10. Apparatus according to claim 8, in which the elements forming an obstacle to the flow are distributed on the path of each of the fractional flows.

11. Apparatus according to claim 1, in which the elements forming an obstacle to the flow have a total extent along the Oz direction which is less than the local dimension of the apparatus in said Oz direction, thereby leaving empty gaps for the flow on either side of said elements in said Oz direction.

12. Apparatus according to claim 1, in which the elements forming an obstacle to the flow have an extent in a direction contained in the Oxy plane which increases with decreasing angle formed by said elements relative to the local flow direction.

13. Apparatus according to claim 1, in which central elements situated in the central portion of the flow along the Oz direction have an extent in a direction contained in the Oxy plane which is greater than that of the elements situated on either side of the central elements in the Oz direction.

14. Apparatus according to claim 1, in which the elements are plate shaped and substantially perpendicular Oxz plane.

15. Apparatus according to claim 14, in which the plate-shaped elements form an angle relative to the Oxy plane which increases with decreasing area of said plate as encountered by the fluid flow.

* * * * *